| United States Patent [19]
Sakurai et al.

[11] Patent Number: 4,603,358
[45] Date of Patent: Jul. 29, 1986

[54] AUTO-REVERSE TAPE RECORDING AND REPRODUCING APPARATUS

[75] Inventors: Izumi Sakurai; Masao Tsuruoka; Masayuki Ishizu; Kiyoshi Ishige, all of Chiba, Japan

[73] Assignee: Sony Corporation, Tokyo, Japan

[21] Appl. No.: 746,084

[22] Filed: Jun. 18, 1985

[30] Foreign Application Priority Data

Jun. 25, 1984 [JP] Japan .................. 59-130300

[51] Int. Cl.⁴ .................. G11B 15/10; G11B 15/18
[52] U.S. Cl. ..................... 360/74.1; 360/71; 360/137
[58] Field of Search ............ 360/137, 74.1, 74.2, 360/74.3, 74.4, 74.5, 74.6, 74.7, 71

[56] References Cited

U.S. PATENT DOCUMENTS

4,408,237 10/1983 Takahashi et al. ............ 360/96.3
4,544,965 10/1985 Diepholz et al. ............... 360/71
4,547,823 10/1985 Ri et al. ........................ 360/90

Primary Examiner—George G. Stellar
Attorney, Agent, or Firm—Hill Van Santen, Steadman & Simpson

[57] ABSTRACT

An auto-reverse tape recording and reproducing apparatus has a mode setting means for holding a tape running direction in normal mode or reverse mode, and this mode setting means is returned to the normal mode position in connection with the return movement of an operating means for playing, only when the mode setting is in the reverse mode position, and further this mode setting means is not displaced in connection with the forward movement of a mode change-over means when a base plate of a magnetic head is in the returned position, but is displaced in connection with the forward movement of the mode change-over means when the base plate of the head is in the forward position.

16 Claims, 9 Drawing Figures

AUTO-REVERSE TAPE RECORDING AND REPRODUCING APPARATUS

BACKGROUND OF THE INVENTION

1. Field of the Invention

This invention relates to an auto-reverse tape recording and reproducing apparatus, and particularly to an auto-reverse tape recording and reproducing apparatus, wherein a tape is changed over automatically into a state of normal mode as soon as the tape is stopped under a state of reverse mode, so that the tape always starts with the state of normal mode whenever the tape begins to run on constant speed, and wherein the mode change-over through a mode change-over means cannot be performed even though a mode change-over means is operated erroneously at the time of STOP, FF, REW, or the like, when the base plate of a head is in a returned position, but performed when the base plate of the head is in a forward position and the tape is running on constant speed.

2. Description of the Prior Art

When using an auto-reverse tape recorder, if an operator does not know which running mode, normal mode or reverse mode, exists at the time when a recording or reproducing is to be started, it is difficult for him to use the tape recorder easily. For this reason, some conventional tape recorders employ two respective play buttons for normal mode and reverse mode, but such structure raises the manufacturing costs.

Therefore, there are other conventional tape recorder including a play button and a mode change-over bar, but they are still troublesome to the operator, because he cannot know yet which the tape running mode is set in as the electric current is cut off at stop mode, and further, the recording or reproducing is not always started with normal mode, because there is a chance as to have the mode change-over bar operated erroneously at the time of STOP, FF, REW or the like.

Hence, it becomes necessary to provide an auto-reverse mechanism in which the mode is automatically changed over to normal mode whenever the tape is stopped under the state of reverse mode, and a constant speed run of tape always begins to run with normal mode.

Further, in case of the auto-reverse tape recorder capable of only one-way recording, the recording does not start even though an operating button for recording is pushed when the tape is under the state of reverse mode, so that for recording is pushed when the tape is under the state of reverse mode, so that the operator often makes a mistake and the tape recorder develops some trouble. Therefore, it is necessary for the tape to start in running with normal mode even at the time of recording.

OBJECTS AND SUMMARY OF THE INVENTION

Accordingly, it is an object of the present invention to provide an auto-reverse tape recording and reproducing apparatus in which a tape returns automatically to the state of normal mode if a stop button is pushed, or an operating bar for playing is operated thereafter, at a time when the tape runs on constant speed in the state of reverse mode, and the tape always starts in normal mode whenever the tape begins to run on constant speed.

Another object of the invention is to provide an autoreverse tape recording and reproducing apparatus in which an operator need not confirm which tape running mode the apparatus is set in, normal mode or reverse mode, on occasion of stop mode so that he may operate the apparatus easily.

A further object of the invention is to provide an auto-reverse tape recording and reproducing apparatus without any telltale indicating the running mode the apparatus is set in, whereby the apparatus is simplified in construction and may be manufactured economically.

Still a further object of the invention is to provide an auto-reverse tape recording and reproducing apparatus best suited for a one-way recording apparatus which ought always to be started in the normal mode.

Still another object of the invention is to provide an auto-reverse tape recording and reproducing apparatus in which a change-over does not occur, even though a mode change-over bar is errouneously operated at the time of STOP, FF, REW, or the like.

DETAILED DESCRIPTION OF A PREFERRED EMBODIMENT

Figure 1:
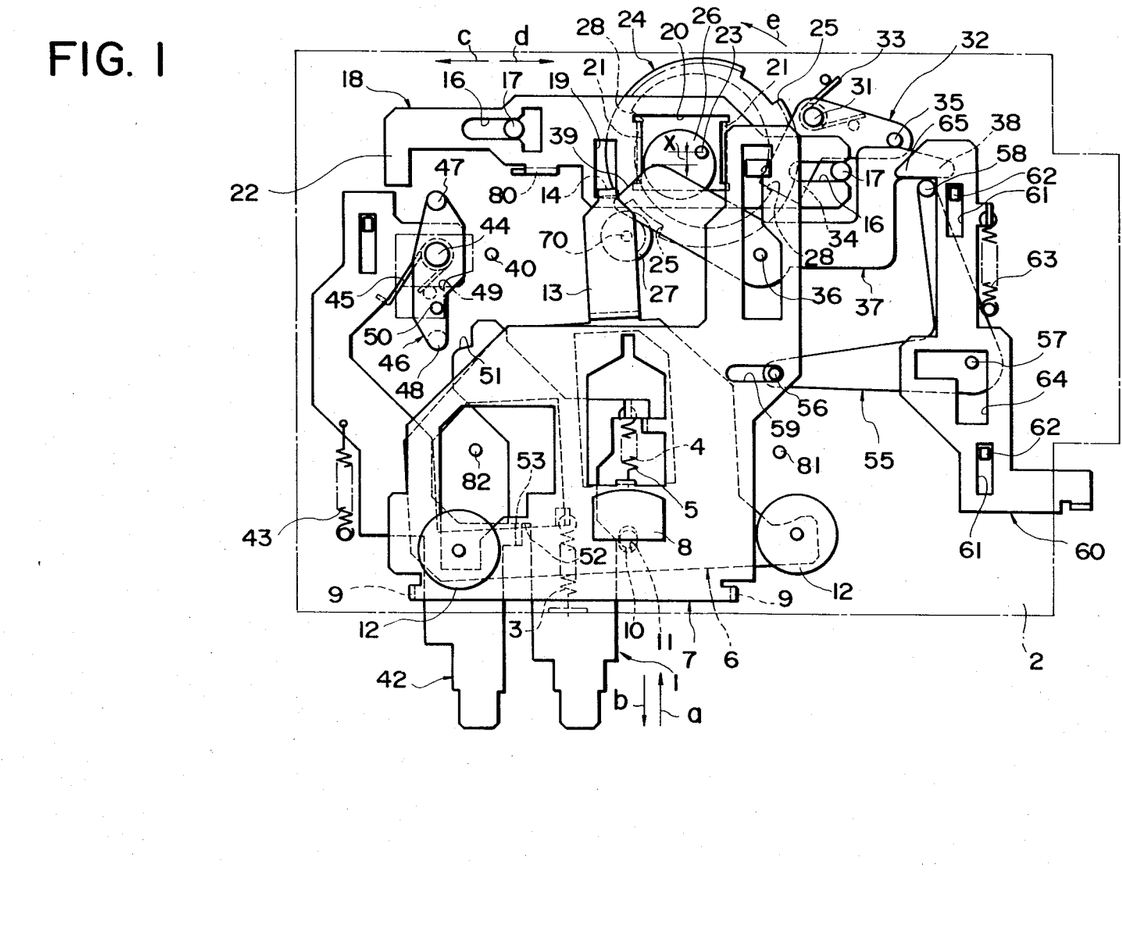
FIG. 1 is a plan view of an auto-reverse mechanism under a state of stop mode, the mechanism being mounted on a chassis on which a tape cassette is loaded.

Reference numeral 1 shown in FIG. 1 designates an operating bar for playing which is arranged under a chassis 2 on which a tape cassette is loaded. The operating bar 1 is locked in a predetermined position when moved forward in direction of arrow a against a tension spring 3 as guided by the chassis 2, and returned to the original position due to the elastic force of the tension spring 3 as soon as a stop button is operated so as to unlock the operating bar 1.

The operating bar 1 is connected through a tension spring 4 with a change-over bar 6 of pinch rollers 12 which is positioned over the chassis 2, and connected through a tension spring 5 with the base plate of a head 7 which is positioned over the change-over bar 6, the tension spring 5 being arranged over the tension spring 4.

The base plate 7 has a magnetic head 8 in the predetermined position of its upper side, and is guided by the chassis 2 by way of a pair of downward bent portions 9, etc., whenever the base plate 7 is moved forward in the direction of arrow a through the tension spring 5 by the operating bar 1 and moved backward in the direction of arrow b due to a direct push of the operating bar 1.

A fulcrum pin 10 protrudes downward from the base plate 7 and fits loosely into an elongated hole 11 of the change-over bar 6. Accordingly, the change-over bar 6 can be not only moved forward in direction of arrow a or backward in direction of arrow b similarly to base plate 7, but also swung on the fulcrum pin 10.

Further, the change-over bar 6 has a pair of pinch rollers 12, each of which is mounted rotatably on its right or left side almost equally separated from the elongated hole 11, and has a projection 13 which extends along the major axis of the elongated hole 11 and has a downward bent portion 14 at its distal end.

A reciprocal bar 18 is so mounted on the under surface of the chassis 2 as to be guided by a pair of pins 17, which protrude from the chassis and are loosely fitted into respective elongated holes 16 of the reciprocal bar 18, and moved slidably in directions c and d. Further, the bent portion 14 of the change-over bar 6 is engaged with a rectangular hole 19 formed in a predetermined position of the reciprocal bar 18.

Formed in a predetermined portion of the reciprocal bar is an aperture 20, in the right and left edges of which respective downward bent portions 21 of the reciprocal bar 18 are disposed. Furthermore, a projection 22 protrudes from the left end of the reciprocal bar 18 almost perpendicularly to its sliding direction.

Under the reciprocal bar 18, there is a partially toothless gear 24 which is rotatably mounted on a camshaft 23 protruded from the chassis 2. This gear 24 has respective toothless portions 25 which are on opposite sides of the gear with respect to the camshaft 23.

A circular disc cam 26 formed integrally with the gear 24 comes in contact with either of the bent portions 21 of the reciprocal bar 18, which functions as a cam follower.

The gear 24 is engaged with a driving gear 27 so as to be rotated in direction of arrow e, as the driving gear 27 is driven by a motor 71. Further, clicks 28 are formed integrally with the gear 24, and these clicks 28 are on opposite sides with respect to the camshaft 23.

A lock lever 32 is so arranged under the reciprocal bar 18 as to be swung on a pivot 31 which extends from the chassis 2, and urged in the clockwise direction by a torsion spring 33. One of its arms 34 can be engaged with either of the clicks 28, and a pin 35 protrudes upward through the chassis 2 from the other of the arms.

Arranged between the chassis 2 and base plate 7 over the chassis 2 is an unlocking lever 37 which is pivot on reel shaft 36. The right end portion in FIG. 1 of the unlocking lever 37 is engaged with the pin 35 of the lock lever 32 and has a projection 38. Further, at the left end portion of the unlocking lever 37, there is formed aslant a pressed edge 39. Reference numeral 40 in FIG. 1 designates the other reel shaft which pairs with the reel shaft 36.

An operating bar 42 for recording 42 is arranged along by the operating bar 1 for playing. This operating bar 42 also can be moved forward in direction of arrow a by hand, and is moved backward in direction of arrow b due to the elastic force of a tension spring 43.

A lever 46 is swung on a fulcrum pin 44 fixed on a predetermined position of the operating lever 42, and a torsion spring 45 urges the lever 46 in the counterclockwise direction. The lever 46 has respective pins 47, 48 arranged at its opposite ends and a pin 50 which is located between the fulcrum pin 44 and one of the pins 48 and guided by a guide hole 49 bored in the chassis 2.

The pin 47 can be engaged with the projection 22 of the reciprocal bar 18 and the pin 48 can be engaged with an engagement portion 51 formed at the distal end of the play operating bar 1. Further, contact portions 52 and 53 of the respective operating bars 1 and 42 come in contact with each other, so that the operating bar for playing 1 is moved together, with the operating bar for recording 42, when the operating bar for recording 42 is moved forward in direction of arrow a.

A bell crank member 55 is arranged between the chassis 2 and base plate 7 as shown at the right side in FIG. 1, and has respective pins 56, 58 at its distal ends and a pin 57 at its center. One of the pins 56 is guided by an elongated hole 59 formed in the base plate 7 and the other of the pins 58 is engaged with the projection 38 of the unloading lever 37.

Arranged over the member 55 is a mode change-over bar 60, a pair of guide holes 61 in which are guided by respective small posts 62 protruding from the chassis 2. The mode change-over bar 60 can be moved forward in direction of arrow a by hand and is moved backward in direction of arrow b by the elastic force of a tension spring 63.

At the central portion of the mode change-over bar 60, there is formd a L-shaped hole 64, in which the pin 57 of the member 55 is loosely fitted, and a projection 65 formed at the distal end of the mode change-over bar 60 is engaged with the pin 58 of the member 55.

Next, a constant speed run mechanism of tapes which is changed over due to the movement of the reciprocal member 18, will be described on referring to FIG. 2.

Figure 2:
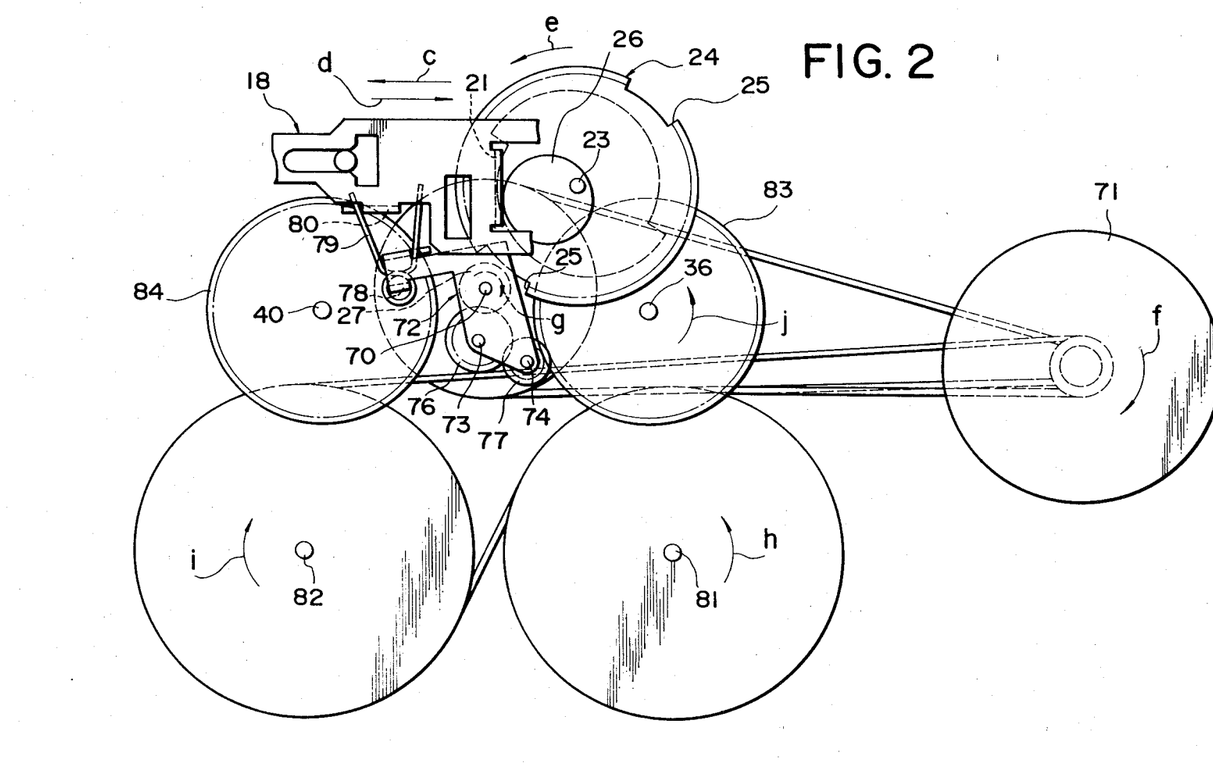
FIG. 2 is a plan view of a constant speed run mechanism of a tape under a state of normal mode.

As illustrated in FIG. 2, the driving gear 27 which drives the gear 24 is driven by a motor 71 through a belt, and a L-shaped lever 72 can be swung on the shaft 70 of the driving gear 27. One of the arms of the lever 72 has two shafts 73 and 74, on which a first intermediate gear 76 engaged with the driving gear 27 and a second intermediate gear 77 engaged with the first intermediate gear 76 are mounted, respectively.

In the other arm of the lever 72, there is formed a bent portion 78, to which a spring 79 is fixed, and two free ends of the spring 79 can be engaged with respective edges of downward bent portion 80 formed in position of the reciprocal bar 18.

In the meantime, the motor 71 rotates in direction of arrow f as shown in FIG. 2 and thereby, the shaft 70 is rotated in direction of arrow g, so that the partially toothless gear 24 is rotated in direction of arrow e. Further, one of two capstans 81 is rotated in direction of arrow h and the other capstan 82 is rotated in direction of arrow i by the above motor 71.

As the constant speed run mechanism of tapes is constituted as mentioned above, the bent portion 80 of the reciprocal bar 18 abuts against the left free end of the spring 79 and pushes this free end, when the reciprocal bar 18 slides in direction of arrow c. Accordingly, the lever 72 is swung on the shaft 70 in the counterclockwise direction, and then the second intermediate gear 77 engages with a driving gear 83 which drives the reel shaft 36, so that the reel shaft 36 is rotated in direction of arrow 3 so as to wind up the tape on a reel mounted on the reel shaft 36.

Figure 4:
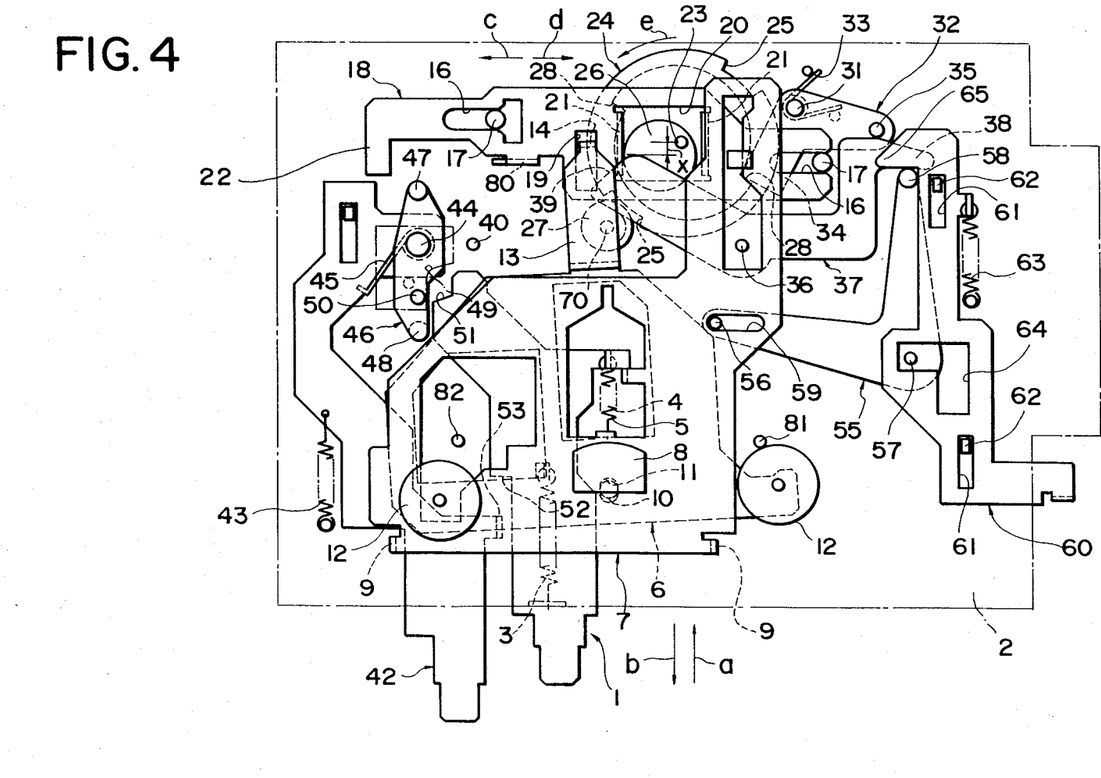
FIG. 4 is a partial plan view of the auto-reverse mechanism shown in FIG. 1 under a state of normal mode.

On the other hand, the right-hand pinch roller 12 in FIG. 4 is pressed against the capstan 81 as mentioned later, so that the tape runs with constant speed under the state of normal mode.

In the meantime, after the second intermediate gear 77 engages with the driving gear 83, the reciprocal bar 18 moves successively in direction of arrow c toward a locked position, so that the reciprocal bar 18 is urged in direction of arrow d when held under the locked state due to the elastic force of the spring 79.

Figure 3:
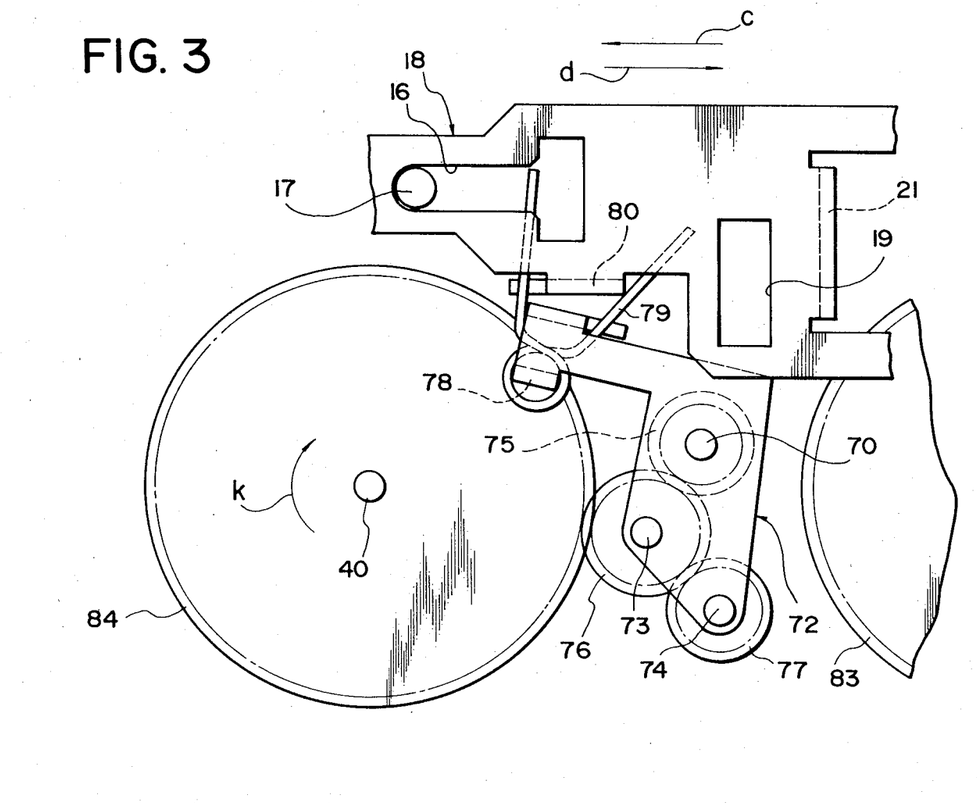
FIG. 3 is a plan view of a change-over mechanism included in the constant speed run mechanism of the tape shown in FIG. 2 under a state of reverse mode.

On the contrary, when the reciprocal bar 18 slides in direction of arrow d, the lever 72 is swung in the clockwise direction and then the first intermediate gear 76 engages with a driving gear 84 which drives the reel shaft 40 as shown in FIG. 3, so that the reel shaft 40 is rotated in direction of arrow k so as to wind up the tape on a reel mounted on the reel shaft 40. And it is similar to the above case that the left hand pinch roller 12 is pressed against the capstan 82, and the tape runs with constant speed under the state of reverse mode. In addition, it is also similar that the reciprocal bar 18 is urged in direction of arrow c.

It is not illustrated in the drawings, but the lever 72 is held nonrotatably in its neutral position by the base plate 7 when the base plate 7 returns to the original position, and becomes freely rotatable when the base plate 7 is situated in the forward position.

Now, the function of the reciprocal bar 18 will be described hereinafter.

Under the state of stop mode shown in FIG. 1, or normal mode shown in FIG. 4, wherein the left-hand cam follower 21 is pushed by the circular disc cam 26 in direction of arrow c, so that the reciprocal bar 18 is displaced to the left and the engagement portion 34 of the lock lever 32 is engaged with the click 28 of the partially toothless gear 24, the driving gear 27 is just opposite to the toothless part 25 of the gear 24, so that the driving gear 27 may not be engaged with the gear 24. Further, the partially toothless gear 24 is rotatably urged in direction of arrow e due to a moment of a force, that is, the product of the distance x and the elastic force of the spring 79 where x is the distance between the camshaft 23 and the point of contact of the circular disc cam 26 with the cam follower 21.

Accordingly, as soon as the click 28 of the gear 24 is disengaged from the engagement portion 34 of the lock lever 32, the reciprocal bar 18 rotates the gear 24 in direction of arrow e as it slides in direction of arrow d, and then the gear 24 engages with the driving gear 27. Hence, the gear 24 is driven by the driving gear 27 to be rotated successively in direction of arrow e. Soon after, the circular disc cam 26 comes in contact with the right-hand cam follower 21 and push the reciprocal bar 18 in direction of arrow d.

After a time, as the driving gear 27 approaches again to the toothless part 25 of the gear 24, the reciprocal bar 18 is urged in direction of arrow c due to the elastic force of the spring 79 as shown in FIG. 3, so that the gear 24 is successively rotated in direction of arrow e due to the above-mentioned moment of the force even after the gear 24 is disengaged from the driving gear 27, and then the driving gear 27 is brought to the position just opposite to the toothless part 25 of the gear 24. At this time, the engagement portion 34 of the lock lever 32 is again in the state of engaging with the click 28 of the gear 24 and the reciprocal bar 18 is held in the state illustrated in FIG. 5.

Figure 5:
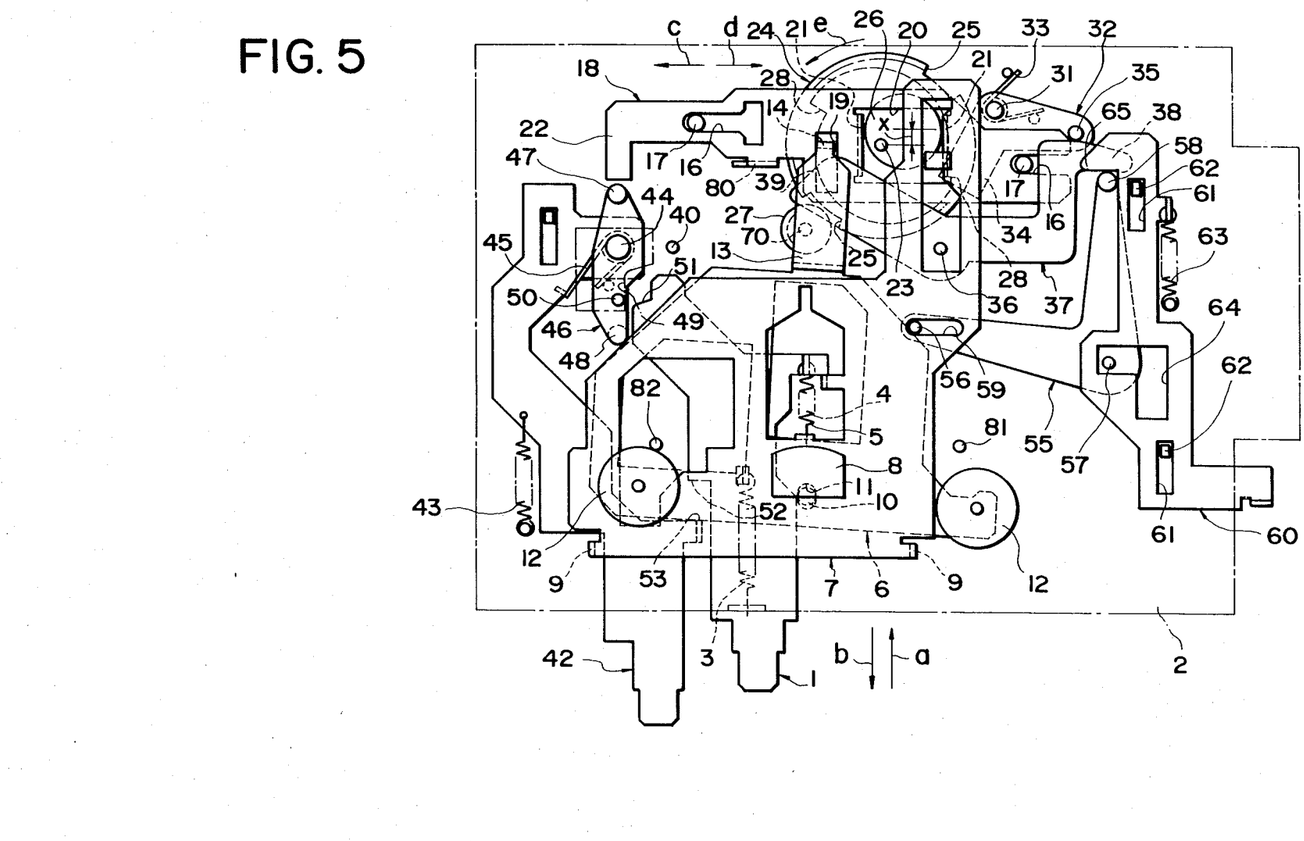
FIG. 5 is a plan view of the auto-reverse mechanism shown in FIG. 1 under a state of reverse mode.

When the lock lever 32 is disengaged under the state illustrated in FIG. 5, the gear 24 is rotated in direction of arrow e soon by the driving gear 27 and the circular disc cam 26 pushes the reciprocal bar 18 in direction of arrow c. In a little while, the lock lever 32 engages with the click 28 of the gear 24 and the reciprocal bar 18 comes to the position illustrated in FIG. 1 or 4.

The function of the mechanism as mentioned above will be described hereinafter.

Under the stop mode illustrated in FIG. 1, wherein the reciprocal bar 18 is displaced to the left, and therefor, the change-over bar 6 of the pinch rollers 12 is slanted a little to the left due to the engagement of its bent portion 14 with the rectangular hole 19, if the operating bar for playing 1 is moved forward in direction of arrow a so as to pull the change-over bar 6 and base plate 7 in the same direction through the respective tension springs 4 and 5, the right-hand pinch roller 12 is pressed against the right-hand capstan 81 as illustrated in FIG. 4.

And when the operating bar 1 is locked after its successive forward movement, the pinch roller 12 is pressed against the capstan 81 more by the elastic force of the spring 4, and that the base plate 7 is stopped at the predetermined position shown in FIG. 4. In addition, as the driving gear 83 of the reel shaft 36 is in the state of engaging with the second intermediate gear 77, the mechanism comes into normal mode.

Next, as soon as the end of the tape is detected under the state of normal mode, the lock lever 32 is disengaged from the click 28 of the gear 24, and the reciprocal bar 18 is moved in direction of arrow d. Hence, the change-over bar 6 is swung clockwise on the fulcrum pin 10 due to the engagement of its bent portion 14 with the rectangular hole 19 of the reciprocal bar 18, so that the left-hand pinch roller 12 is pressed against the capstan 82 as illustrated in FIG. 5. In addition, as the driving gear 84 of the reel shaft 40 is engaged with the first intermediate gear 76 as shown in FIG. 3, the mechanism comes automatically into reverse mode.

Under the state of normal mode illustrated in FIG. 4, if the stop button is pushed and therefore, the operating bar is returned to the original position, the change-over, bar 6 is moved backward in direction of arrow b, so that its bent portion 14 is moved within the rectangular hole 19 from the position illustrated in FIG. 4 to the position illustrated in FIG. 1. However, the bent portion 14 does not come into contact with the pressed edge 39 of the unlocking lever 37, so that the unlocking lever 37 is not swung at all during the above movement of the bent portion 14. Therefore, the mechanism comes into stop mode as illustrated in FIG. 1.

Figure 6:
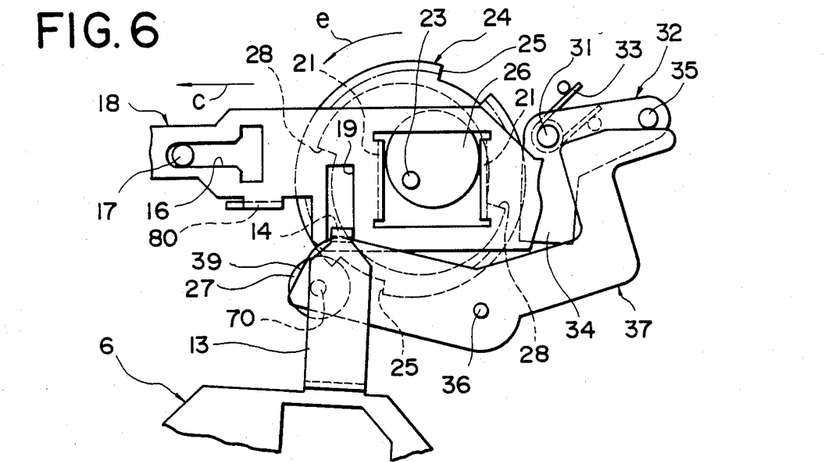
FIG. 6 is a partial plan view of the auto-reverse mechanism at a time of stop mode under a state of reverse mode.

However, under the state of reverse mode illustrated in FIG. 5, the bent portion 14 comes in contact with the pressed edge 39 of the unlocking lever 37, becase the reciprocal bar 18 has been displaced to the right. The bent portion 14 pushes the pressed edge 39 of the unlocking lever 37 as shown in FIG. 6, so that the unlocking lever 37 is swung counterclockwise on the reel shaft 30 so as to swing the lock lever 32 counterclockwise against the elastic force of the torsion spring 33.

Accordingly, the engagement portion 34 of the lock lever 32 is disengaged from the click 28 of the gear 24, and thereby the gear 24 rotates in direction of arrow e at least until the gear 24 is engaged with the driving gear 27.

Therefore, when the driving gear 27 is in the driven state, the reciprocal bar 18 is moved successively in direction of arrow c until it is locked in the predetermined position as shown in FIG. 1, and even if the driving gear 27 is in the stopped state, the reciprocal bar 18 is similarly moved in direction of arrow c as soon as the motor is started by the operating bar for playing 1. After all, the tape always starts to run under the state of normal mode, whenever the operating bar for playing 1 is operated.

Next, the functions of the dichotomous member 55 and mode change-over bar 60 will be described hereinafter.

At the time of STOP, FF or REW mode, when the base plate of the head 7 is in the original position, the right end portion of the unlocking lever 37 is held under the state of abutting lightly against the pin 35 of the lock lever 32, and further the pin 58 of the dichotomous member 55 is held under the state of abutting lightly against the projection 38 of the unlocking lever 37 as shown in FIG. 1.

The pin 57 of the dichotomous member 55 is fitted in one part of the L-shaped hole 64 of the mode change-over bar 60, which is parallel to the sliding direction of the change-over bar 60. Accordingly, it does not occur for the pin 57 to come into contact with the edge of the hole 64 and to be moved by the change-over bar 60, even if the mode change-over bar 60 is pushed forward erroneously in direction of arrow a. Thus, the lock lever 32 is not swung and it does not occur that the tape running mode is changed over from normal mode to reverse mode. As the result, it never occurs that the tape starts to run under the state of reverse mode.

In the meantime, when the base plate 7 is moved in direction of arrow a, the pin 56 of the dichotomous member 55 is to be pushed in the same direction of arrow a. However, as the pin 58 of the dichotomous member 55 is not moved in direction of arrow a due to the elastic force of the torsion spring 33, the dichotomous member 55 is swung clockwise on the pin 58.

Figure 7:
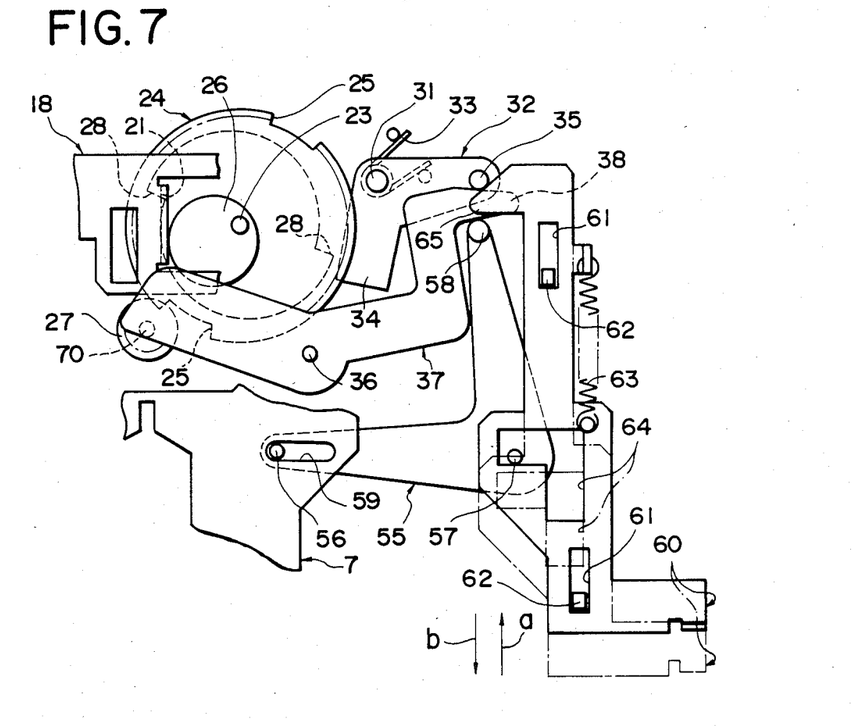
FIG. 7 is a plan view for indicating the function of a mode change-over bar.

Therefore, the pin 57 is moved to be positioned in the other part of the L-shaped hole 64, which is perpendicular to the sliding direction of the change-over bar 60 as shown in FIG. 4. Under this state, when the mode change-over bar 60 is moved in direction of arrow a, the pin 57 is pushed in the same direction by the edge of the L-shaped hole 64, so that the dichotomous member 55, is swung counterclockwise on the pin 56 as illustrated in FIG. 7.

As the result, the pin 58 pushes the pin 35 of the lock lever 32 through the projection 38 of the unlocking lever 37, so that the lock lever 32 is swung counterclockwise and the engagement portion 34 is swung counterclockwise and the engagement portion 34 of the lock lever 32 is disengaged from the click 28 of the gear 24. Thus, the tape running mode can be changed over to reverse mode shown in FIG. 5 if it is held in normal mode shown in FIG. 4, or to normal mode shown in FIG. 4 if it is held in reverse mode shown in FIG. 5.

The mode change-over bar 60 is moved backward in direction of arrow b, as soon as pushing of the mode changeover bar 60 is ceased. At this time, the projection 65 of the mode change-over bar 60 comes in contact with the pin 58 of the dichotomous member 55, so that the dichotomous member 55 is moved backward to the original position.

Next, the function of the operating bar for recording 42 will be described hereinafter on referring to FIG. 8.

Figure 8:
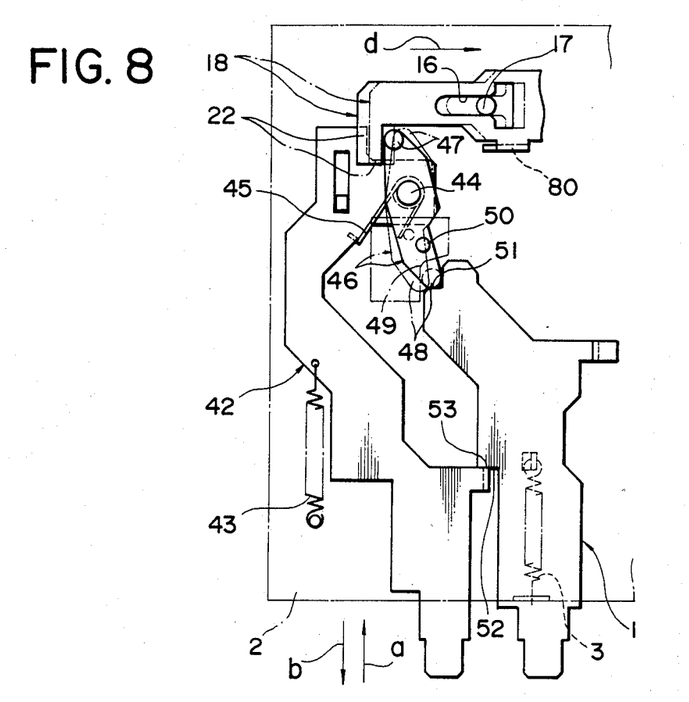
FIG. 8 is a plan view for indicating the function of an operating bar for recording.

When the operating bar 42 is pushed in direction of arrow a under the state of stop mode shown in FIG. 8, the operating bar for playing 1 is moved forward together with the operating bar 42 in direction of arrow a. And as the operating bar 42 is moved forward, the lever 46 secured rotatably to the operating bar 42 and urged counterclockwise by the torsion spring 45 is rotated counterclockwise, because the guided pin 50 of the lever 46 is disengaged from the edge of the guide hole 49.

Further, when the operating bar for playing 1 is locked at the predetermined position, the pin 48 of the lever 46 is engaged with the engagement portion 51 of the operating bar for playing 1 as shown in FIG. 8, and thereby, the operating bar for recording 42 does not return to the original position but is kept held in the forward position so as to come into recording mode. At this time, the pin 47 of the lever 46 is situated at the inner side of the projection 22 of the reciprocal bar 18 as shown in FIG. 8.

As soon as the end of the tape is detected under the state of recording mode, or when the mode change-over bar 60 is operated, the reciprocal bar 18 is slid in direction of arrow d as previously stated, so that the pin 47 of the lever 46 is pushed in the same direction.

As the result, the lever 46, is swung clockwise on the fulcrum pin 44 against the elastic force of the torsion spring 45, and then the pin 48 of the lever 46 is disengaged from the engagement portion 51 of the operating bar for playing 1, so that the operating bar for playing 1 is kept holding in the forward position. Thus, the tape recording under the state of reverse mode is prevented and if the stop button is pushed in succession thereto, the tape is brought to stop mode shown in FIG. 1 under the state of normal mode.

In the meantime, even if the operating bar for recording 42 is pushed erroneously under the state of reverse mode, the lever 46 can not be moved forward to due to contact of its pin 47 with the projection 22 of the reciprocal bar 18 as shown in FIG. 5, so that the tape recording is obstructed under the state of reverse mode.

Figure 9:
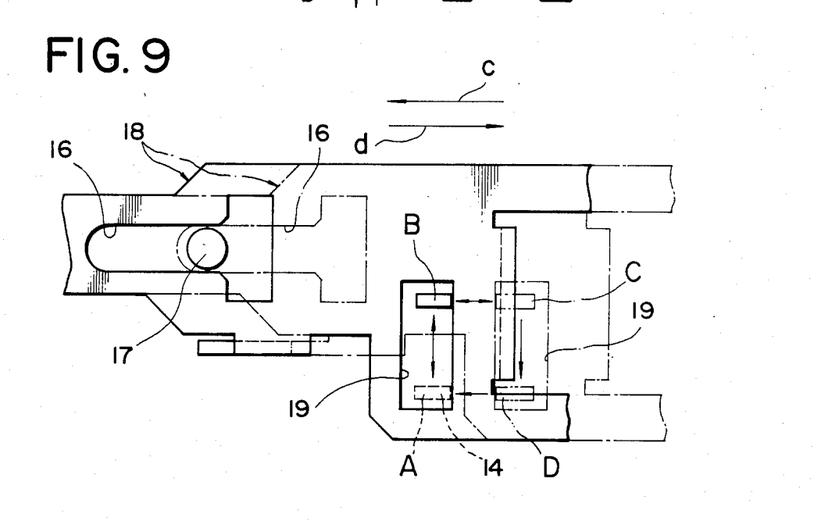
FIG. 9 is a plan view for indicating the positional correlation between a to-and-fro bar and a change-over bar of pinch rollers.

Now, there will be described in summary the correlation of the tape running mode with relative position of the reciprocal bar 18 bent portion 14 of the change-over bar 6 of the pinch rollers 12, referring to FIG. 9.

When the bent portion 14 of the change-over bar 6 engaging with rectangular hole 19 of the reciprocal bar 18 is in position A, the reciprocal bar 18 is displaced in direction of arrow C, so that the tape is in the state of stop mode under the state of normal mode.

At this time, if the operating bar for playing 1, or the operating bar for recording 42 is operated, the bent portion 14 of the change-over bar 6 is moved to position B, so that the tape is in the state of normal mode or recording mode under normal mode. At this time, when the stop button is pushed, the bent portion 14 returns to position A, so that the tape is again in the state of stop mode.

In the meantime, if the end of the tape is detected, or the mode change-over bar 60 is pushed while the bent portion 14 is in position B as aforementioned, the reciprocal bar 18 is slid in direction of arrow d and the bent portion 14 comes into position C, so that the tape is in the state of reverse mode. And under this state, if the end of the tape is detected or when the mode change-over bar 60 is pushed, the reciprocal bar 18 is slid in direction of arrow C, and the bent portion 14 is moved to position B, so that the tape is in the state of normal mode again.

If the stop button is pushed while the bent portion 14 is in aforementioned position C, the bent portion 14 is moved to position D and the reciprocal bar 18 is slid in direction of arrow c, so that the bent portion 14 returns to position A and the tape is in the state of stop mode under the state of normal mode. The stop button, as in the embodiments described above, may be the conventional recorder stop mechanism which automatically releases previously actuated playing or recording operating means.

In the above embodiment, the change-over bar 6 is used as the means that engages with the reciprocal bar 18 and acts upon the locking lever 37 so as to have the tape changed into normal mode when the stop button is operated under the state of reverse mode, but this change-over bar 6 can be replaced with the operating bar for playing 1 or the base plate 7.

We claim as our invention:

1. In an auto-reverse tape recording and reproducing apparatus comprising:
    an operating means for playing;
    a base plate supporting a magnetic head and movable from a first position where the magnetic head is apart from a tape to a second position where the magnetic head is in touch with the tape;
    a control means for moving the base plate from the first position to the second position;
    A first and second pinch rollers pressed selectively against respective first and second capstans by the control means;
    a pinion rotated by a motor;
    a partially toothless gear engaged with and driven by the pinion;
    a cam means formed with the partially toothless gear;
    a rotation preventing means for preventing the partially toothless gear from being so rotated by its rotation urging means as to result in an engagement with the pinion which is to occupy a position opposite to a toothless part of the gear;
    a disengaging means for disengaging the partially toothless gear from a nonrotatable state caused by the rotation preventing means;
    a mode setting means moved by the cam means so as to make it possible to be set in a normal mode position and a reverse mode position; and
    an engaging means for engaging the mode setting means with the control means;
    the improvement in which said disengaging means is operated in order to engage said partially toothless gear with said pinion only at the time of reverse mode when said second pinch roller is pressed against said second capstan by said control means, and said control means is returning to its stopped mode caused by operation of a stopping means, so that said mode setting means moves from the reverse mode position to the normal mode position, and thereby normal mode is obtained whenever said operating means for playing is operated under the state of stop mode.

2. An auto-reverse tape recording and reproducing apparatus according to claim 1; in which said control means is pivotally mounted on said base plate of the head.

3. An auto-reverse tape recording and reproducing apparatus according to claim 2; in which the center of rotation of said control means is in a position substantially equally spaced apart from said first and second capstans.

4. An auto-reverse tape recording and reproducing apparatus according to claim 1; in which a pair of pinch rollers is disposed on said control means.

5. An auto-reverse tape recording and reproducing apparatus according to claim 4; in which said control means is connected with said operating means for playing through a spring and said pinch rollers disposed on the control means are pressed against said respective capstans due to the elastic force of said spring.

6. An auto-reverse tape recording and reproducing apparatus according to claim 1; in which said disengaging means has a first contact portion abuttable against said control means and a second contact portion abuttable against said rotation preventing means so as to move said rotation preventing means to a position making said partially toothless gear rotatable, said first contact portion lying in a track of said control means from its reverse mode position to its stop mode position, and not lying in a track of said control means from its normal mode position to its stop mode position.

7. An auto-reverse tape recording and reproducing apparatus according to claim 6; in which said disengaging means has a fulcrum between said first and second contact portions.

8. An auto-reverse tape recording and reproducing apparatus according to claim 1; in which said disengaging means is worked by a hand-operated mode change-over means or in response to the signal generated by a tape-end detecting means.

9. An auto-reverse tape recording and reproducing apparatus according to claim 1, further comprising an operating means for recording so as to provide recording mode, and
    a holding means for holding said operating means for recording in the recording mode position, said operating means for recording being disengaged from said holding means by said mode setting means at least when said mode setting means is moved from its normal mode position to its reverse mode position.

10. An auto-reverse tape recording and reproducing apparatus according to claim 9, in which said operating means for recording is obstructed to move toward its recording mode position by said mode setting means, when said mode setting means is in its reverse mode position.

11. An auto-reverse tape recording and reproducing apparatus according to claim 1, further comprising a mode change-over means for changing over the tape running direction, and
    a member which has a first engaging means for engaging with said base plate of the head, a second engaging means capable of putting said disengaging means in action and a third engaging means capable of engaging with said mode change-over means, said disengaging means being worked by said member in connection with the movement of said mode change-over means when said base plate is in said second position, and
    said disengaging means being not worked when said base plate is in said first position, because said member is not moved, even if said mode change-over means is operated.

12. An auto-reverse tape recording and reproducing apparatus according to claim 11; in which said third engaging means of the member is selectively movable from one position capable of to the other position incapable of engaging with said mode change-over means, or from the latter to the former in correspondence with displacements of said base plate.

13. An auto-reverse tape recording and reproducing apparatus according to claim 12; in which said first and third engaging means of the member can be swung on said second engaging means thereof.

14. An auto-reverse tape recording and reproducing apparatus according to claim 11, in which said second and third engaging means of the member can be swung on said first engaging means thereof in corresponding with the movement of said mode change-over means when said base plate is in said second position.

15. An auto-reverse tape recording and reproducing apparatus according to claim 11; in which said member has its first engaging means at one end thereof, its second engaging means at the other end thereof and its third engaging means at the intermediate position between both said ends thereof.

16. An auto-reverse tape recording and reproducing apparatus according to claim 11; in which said mode changeover means has a first slot almost parallel to and a second slot almost perpendicular to the moving direction of said mode change-over means, both said slots communicating with each other.

* * * * *